US006725207B2

(12) United States Patent
Swimm

(10) Patent No.: US 6,725,207 B2
(45) Date of Patent: Apr. 20, 2004

(54) MEDIA SELECTION USING A NEURAL NETWORK

(75) Inventor: Richard S. Swimm, Camas, WA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 414 days.

(21) Appl. No.: 09/841,512

(22) Filed: Apr. 23, 2001

(65) Prior Publication Data

US 2002/0156754 A1 Oct. 24, 2002

(51) Int. Cl.$^{7}$ .............................. G06E 1/00; G06E 3/00; G06F 15/18; G06G 7/00

(52) U.S. Cl. .............................. 706/20; 706/12; 706/15

(58) Field of Search .............................. 706/20, 15, 12

(56) References Cited

U.S. PATENT DOCUMENTS

| | | | | | |
|---|---|---|---|---|---|
| 4,540,887 | A | * | 9/1985 | Minerd et al. | 250/559.4 |
| 4,617,580 | A | | 10/1986 | Miyakawa | 346/136 |
| 5,119,132 | A | | 6/1992 | Butler | 355/208 |
| 5,139,339 | A | * | 8/1992 | Courtney et al. | 356/446 |
| 5,336,714 | A | | 8/1994 | Krutak et al. | 524/608 |
| 5,488,223 | A | | 1/1996 | Austin et al. | 235/375 |
| 5,659,178 | A | * | 8/1997 | Bucher et al. | 250/559.3 |
| 5,724,259 | A | | 3/1998 | Seymour et al. | 364/526 |
| 5,764,251 | A | * | 6/1998 | Hashimoto | 347/16 |
| 5,774,146 | A | | 6/1998 | Mizutani | 347/43 |
| 5,929,432 | A | | 7/1999 | Yamakawa | 250/208.1 |
| 6,119,112 | A | | 9/2000 | Bush | 706/25 |
| 6,192,351 | B1 | | 2/2001 | Persaud | 706/2 |
| 6,480,299 | B1 | * | 11/2002 | Drakopoulos et al. | 358/1.9 |

* cited by examiner

*Primary Examiner*—Wilbert L. Starks, Jr.
*Assistant Examiner*—Joseph P. Hirl

(57) ABSTRACT

A method and system for automatically classifying a print medium entering a printing device as being a print medium type having known properties relevant to print operations. A detection system captures data indicative of optical characteristics of the incoming medium. The data is spectrally examined to derive frequency-related information. At least one neural network utilizes the frequency-related information to determine a medium type. In one embodiment, a major category network determines the medium type as one of five major medium types. Subsequently, the medium is subjected to analysis with a specific neural network for differentiating the identified major media type into narrower categories. Each neural network comprises a layer of adaptive decision-making nodes. Each node includes an activation function for processing the sum of multiple weighted inputs for generating an output. The output is directed to the output level that is at least partially utilized for a medium type determination.

20 Claims, 5 Drawing Sheets

| TRANSPARENCY | PREMIUM-PAPER | PLAIN-PAPER | PHOTO-QUALITY | DEFAULT |
|---|---|---|---|---|
| DEFAULT | DEFAULT | DEFAULT | DEFAULT | |
| HP (TYPE) | MATTE PHOTO | PLAIN A | GOSSIMER | |
| | CLAY COATED | | COMBINED | |
| | SLIGHT GLOSS | | VERY GLOSSY | |
| | GREETING CARD | | | |

52

54

FIG. 4

MEDIA SELECTION USING A NEURAL NETWORK

TECHNICAL FIELD

The invention relates generally to printing mechanisms and more particularly to a system for determining the type of print media, so that the printing mechanism can automatically select an optimal print mode for a specific type of incoming media without requiring user intervention.

BACKGROUND ART

For printers on the commercial market today, such as laser and inkjet printers, automated selection for the type of print media (e.g., transparency media, premium media, glossy photo media, matte photo media, etc.) is not always present. Rather than using a close-loop feedback system for automated selection, these printers use an open-loop process by relying on a user to select the type of print media through the software driver in his/her personal computer (PC). Without correctly selecting the proper type of print media, there is no assurance that the media corresponds to the type selected for a particular print request. Consequently, the type of print media used for printing may not always correspond to an optimal operational mode of the printer.

Printing with an incorrectly selected media often produces poor quality images. The problem primarily stems from the fact that most users do not change the media type settings, even assuming that they are aware of the existing settings. Instead, the typical users print with a default setting of the plain paper-normal mode. This is unfortunate, because if a user inserts an expensive photo media into the printer, the resulting image is sub-standard when the normal mode rather than a photo mode is selected, leaving the user effectively wasting the expensive photo media. Besides photo media, other types of media such as transparencies yield particularly poor image quality when they are printed in the plain paper-normal mode.

One proposed system for a printer to automatically adopt an optimal print mode for a specific type of incoming media without requiring user intervention utilizes an invisible ink code. The code is printed on each sheet of incoming media where it is read by a sensor onboard the printer. The code supplies the printer driver with practical information, such as the media type, manufacturer, orientation and properties. Armed with this information, the system is both reliable and economical in properly selecting the correct type of print media for optimal performance. Thus, the user is no longer burdened by media selection through his/her PC. A concern with the invisible ink code system is that the pre-printed invisible code can become visible when printed over. To avoid this problem, the code is placed at the margin of the print medium. However, since market demand is pushing printers into becoming high-quality photo generators, the invisible code becomes an undesirable artifact for a photographic finish requiring printing up to the edge of the paper. Consequently, placing the invisible code at the margin creates a print defect for printing in the photo-mode.

Another system for print media type determination utilizes a combination of transmissive and reflective sensors. The transmissive sensor measures the amount of light that has passed through the print media and is very effective for some media type determinations, such as the identification of a transparency. The reflective sensors receive light reflected off the surface of the print medium at different angles and are used to measure the specular reflectance and the diffuse reflectance of the medium. By analyzing the ratio of these two reflectance values, a specific medium type is identified. To implement this system, a database having a look-up table of the reflective ratios is used to correlate the ratios with various types of print media. A concern with this system is that new, non-characterized medium is often misidentified, leading to print quality degradation. Another concern is that several different types of media could generate the same reflectance ratio, yet have different print mode classifications.

What is needed is a method and system for reliably determining the type of incoming print medium, so that the printing mechanism can automatically select a proper print mode without requiring user intervention.

SUMMARY OF THE INVENTION

The invention is a method and system that uses neural network techniques for automatically selecting a print medium type without requiring user intervention. A media detection system captures data indicative of characteristics of an incoming medium. The data is spectrally analyzed to derive frequency-related information. At least one media-identifying neural network utilizes the frequency-related information to determine a print medium type. A "neural network" is herein defined as an adaptive arrangement which is specifically designed to adapt on the basis of prior decisions in order to increase the accuracy of decisions. Utilizing a feedforward architecture, the media-identifying neural network includes a layer of decision making nodes (i.e., the "hidden" layer). Each decision making node includes an activation function for processing a sum of multiple weighted inputs to the node. The output from each decision-making node may be directed to a node within the same layer for continuous processing or to a node in an output layer. Each node at the output layer corresponds to a major type of print medium selection, including a transparency type, premium-paper type, plain-paper type, photo-quality type, and default type. Subsequent to identifying the print medium as one of the major medium types, a specific neural network is utilized to narrow the identified type of medium into a more specific category.

The media-identifying neural network comprises an input layer of nodes, an output layer of nodes and one "hidden" layer of nodes sandwiched between the input and output layers. In a first embodiment in which a major network is used to identify an incoming print medium as one of the five major media print types, each node of the input layer is configured to receive one frequency component from the media detection system. Each frequency component is derived by spectrally analyzing (e.g., performing Fourier Transform) the data captured by the media detection system. If there are 84 diffuse frequency components and 84 specular frequency components, the input layer comprises 168 input nodes, with each node being configured to receive one frequency component and to impose a weight on the received component.

The outputs from the input nodes are directed to the "hidden" or decision-making layer. Actual computations utilizing algorithms are performed at the decision-making layer to determine a print medium type. The optimal number of decision-making nodes utilized in this layer is dependent on the nature of the classification. A task requiring greater accuracy may use a greater number of decision-making nodes, while a task requiring greater speed may use a fewer number of nodes. In one embodiment, the decision-making layer comprises at least six decision-making nodes. In a second embodiment, the layer comprises at most ten decision-making nodes. Each decision-making node may be configured to receive 168 weighted inputs and emit one output. An activation function is applied to the sum of the weighted inputs, together with a bias weight for each decision-making node to produce one output.

The decision-making nodes are configured to generate a decision for designating a print medium type for the incoming medium. Each of the nodes in the output layer corresponds to one of the major media types. While the process may designate the subject print medium as one of a transparency type, premium-paper type, plain-paper type, photo-quality type and default type, other types of categorization can be selected without diverging from the scope of the invention.

In the first embodiment, the print medium is further subjected to analysis within a specific neural network to differentiate the selected major media type into narrower categorizes. For example, after a determination by a major network that an incoming print medium is a "photo-quality type," a specific neural network is utilized to further differentiate the "photo-quality type" as one of a: (1) default type, (2) Gossimer type, (3) combined type, and (4) very glossy type.

In a second embodiment, the 168 frequency components are analyzed to determine a print media type of the incoming print medium utilizing other categorizing means, without being subjected to analysis within a major neural network. Specifically, after identifying the print medium as one of the major media types utilizing other categorizing techniques, the incoming medium is subjected to the specific neural network to more clearly differentiate the medium as being one that fits within a narrower category.

The media-identifying network architecture is dependent on the types of training algorithms used for defining the network. During training in the "supervised" mode, a training set of print media for a particular class (e.g., a transparency type) is provided to the printing mechanism. The decision-making nodes are set to be "ON" for that particular class and "OFF" for the other classes. Each node is associated with a bias term, i.e., a weight, to be applied to each input value. A weight determines how much relative effect an input value has on an output value for a given node. Initially, the values for the weights are selected at random. As training continues, error reduction algorithms adjust the actual outputs to the target outputs by reducing the error space for each of the connections in the network. The adjustment utilizes a genetic algorithm or a simulated annealing algorithm to determine a global minima for each connection. An associated weight corresponding to the global minima reduces the measure of error in the network's results. Finally, a conjugate descent is performed to determine the direction of the global minima. The training process continues until the error value is within an acceptable target range.

In one aspect of the invention, an incoming print medium that does not correspond to one of a desired type (i.e., transparency type, premium-paper type, plain-paper type and photo-quality type) is directed to an output node designated as the default type. A faulty training set of print media that does not correspond to one of the desired types may be input to the printing mechanism to teach the system to recognize a non-desired type of incoming print medium.

One of the advantages of the invention is that by utilizing a media-identifying neural network, the system is flexible and can easily be updated to detect other types of print media.

BRIEF DESCRIPTION OF THE DRAWINGS

FIG. 4 is a media type table listing exemplary specific media types for each of the five major media types.

DETAILED DESCRIPTION

Figure 1:
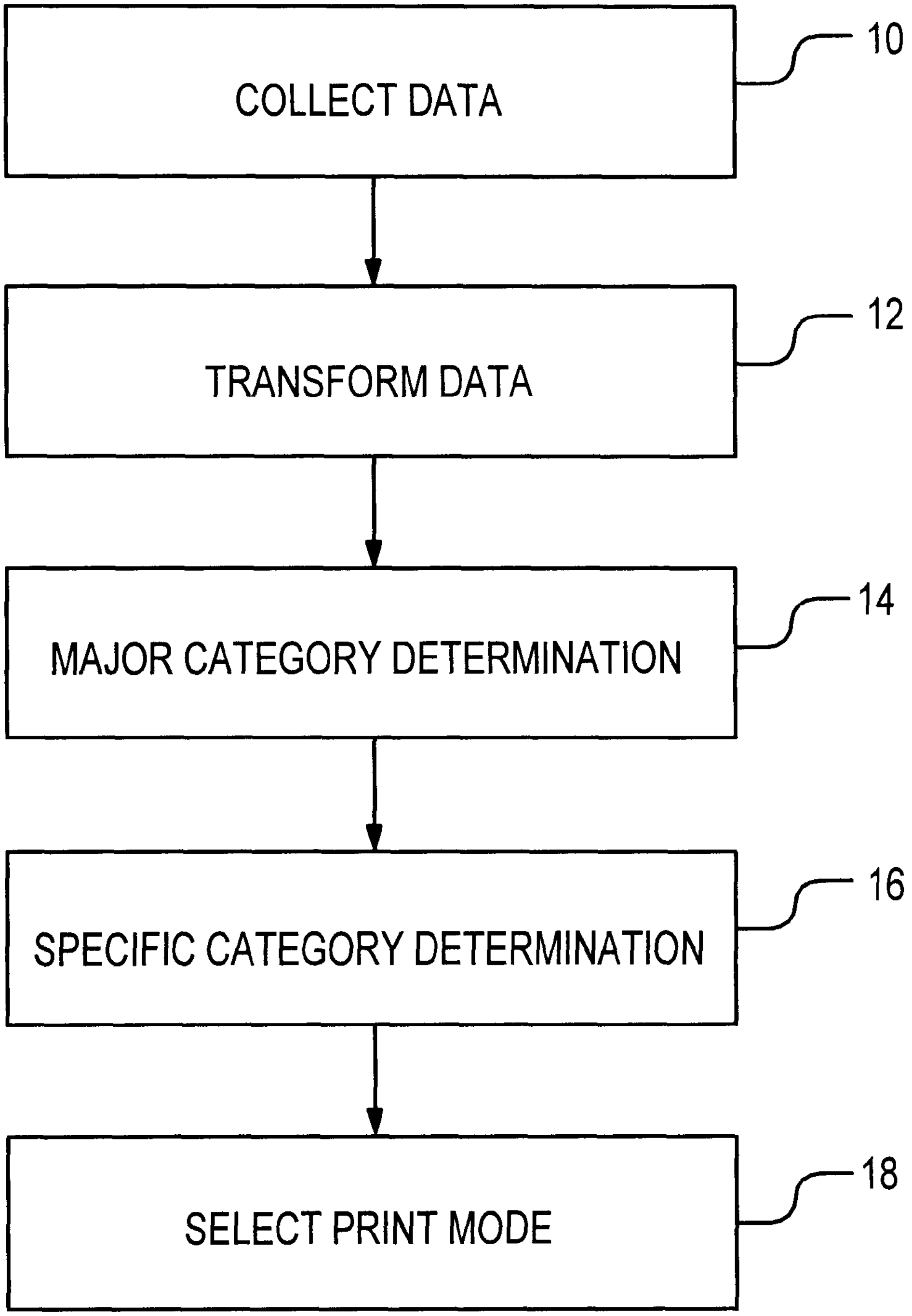
FIG. 1 is a process flow diagram for classifying an incoming print medium into pre-determined categories entering a printing device in accordance with the invention.

In accordance with the invention, FIG. 1 is a process flow of steps for classifying an incoming print medium entering a printing device into pre-determined categories without requiring user intervention. In step 10, data indicative of characteristics of the incoming medium is collected. A transformation step 12 is performed to place the data collected in step 10 into a suitable format for subsequent analysis. Following the transformation step 12, a major category determination step 14 and a subsequent specific category determination step 16 are performed utilizing at least one media-identifying neural network. In one embodiment, the incoming print medium is categorized by an adaptive major neural network as one of the following major media types in step 14: (1) transparency type, (2) premium-paper type, (3) plain-paper type, (4) photo-quality type and (5) default type. Subsequent to identifying a major media type, the incoming print medium is subjected to an adaptive specific neural network for identifying a specific media type in step 16. Subsequently, an operational print mode is selected in step 18. In response to the selection in step 18, the printing device is configured to utilize a particular set of print parameters. The printing device may be any type of device utilized for printing, such as inkjet printers and laser printers.

Figure 2:
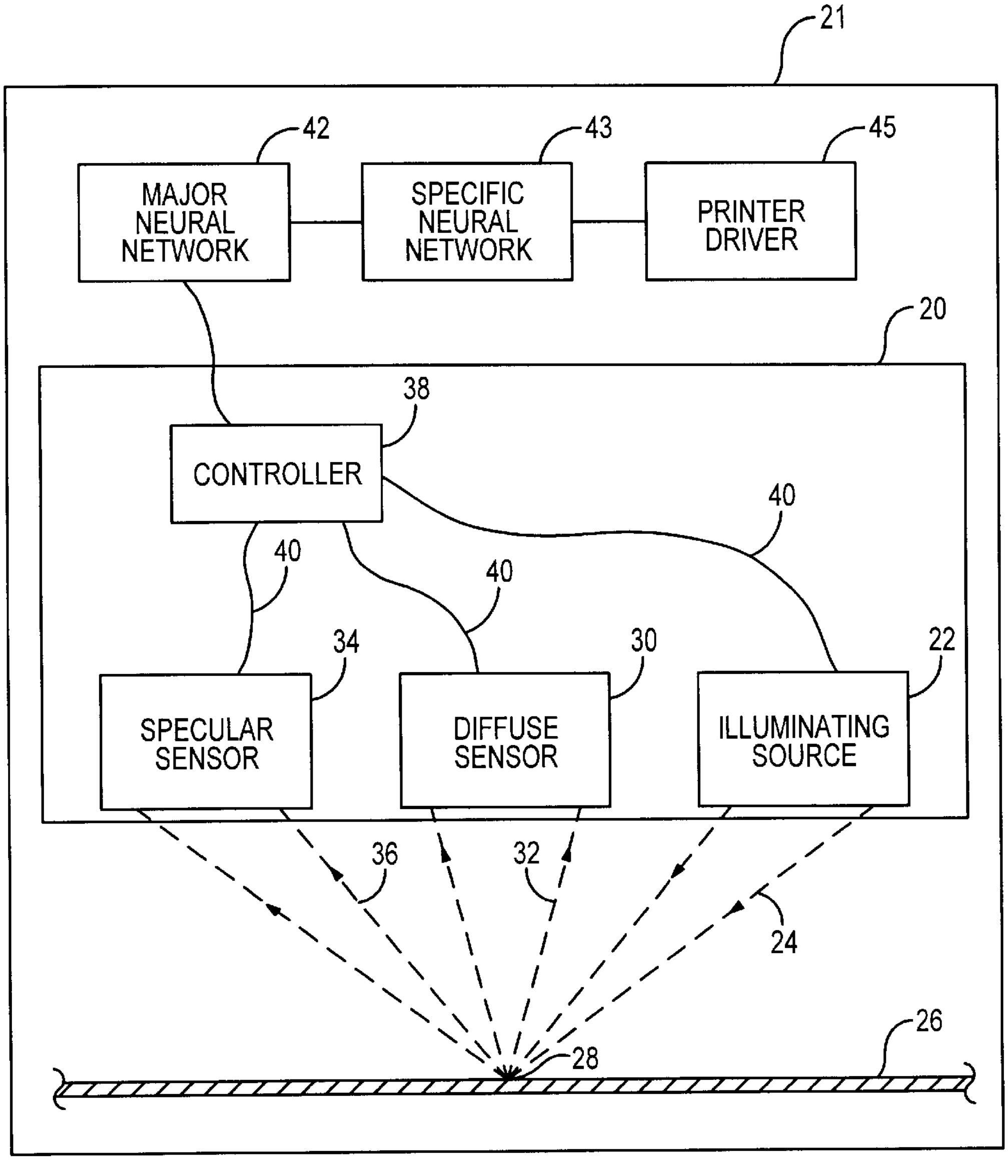
FIG. 2 is a print media detection system of the printing device of FIG. 1 for capturing data reflected off the incoming print medium.

With reference to step 10 of FIG. 1, FIG. 2 shows a print media detection system 20 of a printer 21 comprising: (1) an illuminating source 22 configured to direct a modified light beam 24 onto an incoming print medium 26 at a region of interest 28, (2) a diffuse sensor 30 configured to receive a diffuse reflectance light beam 32 reflected off from the region of interest and (3) a specular sensor 34 configured to receive a specular reflectance light beam 36 reflected off from the region of interest. For capturing print medium data, the illuminating source may be an LED (light emitting diode) for emitting a single pulse of light for each sampling. The emitted pulse may be diffracted by an optical element (not shown) into the modified beam that is focused onto the region of interest. After striking the region of interest, the modified beam is reflected off the medium as both the diffuse reflectance beam and the specular reflectance beam. The diffuse deflected beam has a flame-light scattering of rays arranged in a Lambertian distribution. The specular deflected beam is reflected off the region of interest at the same angle at which the modified beam impinges the region of interest. The diffuse sensor 30 and the specular sensor 34 convert the detected beams into signals for subsequent processing. A controller 38 that is operationally coupled to the illuminating source, diffuse sensor and specular sensor by respective channels 40 controls the illumination of the light source and the capturing of the data reflected off from the illuminated region of interest.

With reference to step 12 of FIG. 1, the signals corresponding to the detected diffuse reflectance beam 32 and the specular reflectance beam 36 are subjected to data transformation into a suitable format for subsequent analysis. Prior to the transformation, the signals may be subjected to a Hanning or Welch windowing function, but this is not critical to the invention. Following the windowing function, a discrete Fourier Transform function is performed on the data to provide 84 frequency-related components for the diffuse reflectance signals and 84 frequency-related components for the specular reflectance signals. A subsequent pre-scaling step, such as subjecting each of the 168 frequency component to a log(n) or sqrt(n) function, may be performed.

The selection of a major media type under the major category determination step 14 of FIG. 1 can be performed by either of two different embodiments. In a first embodiment with reference to FIG. 3, the 84 diffuse frequency components and the 84 specular frequency components are analyzed within a major media-identifying neural network 42 for categorizing the incoming print medium as one of the five major media print types. The major neural network 42 is configured to process the data in a feedforward direction. It comprises an input layer of nodes 44, a "hidden" or decision-making layer of nodes 46 and an output layer of nodes 48. The neural network processes in the feedforward direction when the nodes in one layer send their outputs to the nodes in a next layer (e.g., decision-making layer) without receiving any input back from the nodes in the next layer. This is shown by the direction of signals flowing in a "forward" direction from layer 44 to layer 46 and finally to layer 48. Since there are a total of 168 frequency-related components (84 for the diffuse reflectance data and 84 for the specular reflectance data), there are a total of 168 corresponding nodes in the input layer, with each node configured to receive each of the 168 frequency components. No processing is performed by any node in the input layer. Rather, the input nodes are a semantic construct utilized to represent the input layer.

Within the decision-making layer 46, there are six decision-making nodes. Each decision-making node may be configured to receive weighted values from the nodes in the preceding layer (i.e., the input layer 44) and from the nodes within the same layer (i.e., decision-making layer 46). Each decision-making node has a connective weight associated with each input, multiplies each input value by its associated weight, and sums these values for all of the inputs. The sum is then used as input to an activation function to produce an output for that node. An associated bias term for each function may be utilized for adjusting the output. The activation function is typically a sigmoid function, such as a logistic function or a hyperbolic tangent function. The output from the selected activation function may be directed to a node within the same layer (i.e., decision-making layer) for further processing or to a node in the next layer (i.e., output layer).

While the invention is shown as comprising six decision-making nodes within the decision-making layer, there can be a greater or lesser number of nodes. In an alternative embodiment, the number of decision-making nodes is ten. The optimal number of nodes is dependent on various factors, such as the types of training algorithms utilized and the desired accuracy for the classification scheme. Moreover, there can be a greater number of decision-making layers 46 within the network. Again, the optimal number of layers may be dependent on the types of training algorithms and the desired accuracy of the classification system.

In the preferred embodiment, there are five nodes at the output layer 48. Each output node corresponds to a particular print medium type. An incoming print medium subjected to analysis with the neural network is categorized as one of the five print media types. They include: (1) a transparency type, (2) a premium-paper type, (3) a plain-paper type, (4) a photo-quality type and (5) a default type. While the invention is described as having five major media print types, there can be a fewer number or a greater number of major media print types. Moreover, there can be other types of print media selected for categorization, such as a bonded-paper type, without diverging from the scope of the invention.

Referring to the specific category determination step 16 of FIG. 1, the print medium is further subjected to analysis within a specific media-identifying neural network after being categorized as one of the five major media types by the major neural network 42. Analysis within the specific neural network differentiates a major media type selection into narrower categories. As an example, after determining that the incoming print medium is a "transparency type," a specific neural network is utilized to further differentiate the "transparency type" as either a "default type" or a "HP type." FIG. 4 shows a media type table 52 listing exemplary specific media types for each of the five major media types on row 54.

Figure 3:
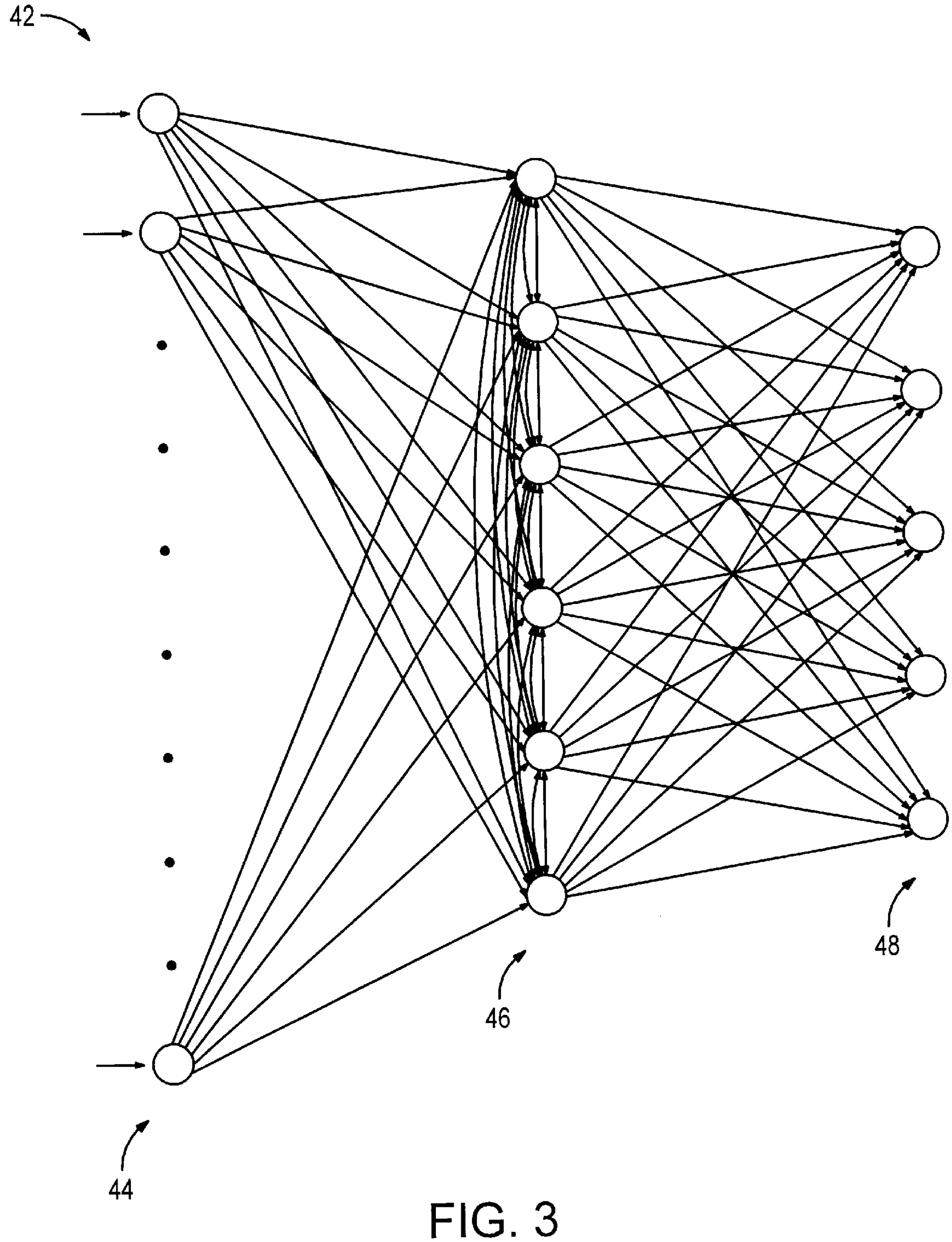
FIG. 3 is a major media-identifying neural network in accordance with the invention for categorizing an incoming print medium as one of the five major media types.

The architecture of the specific neural network is similar to the architecture of the major neural network 42 of FIG. 3. Specifically, the specific neural network comprises an input layer, at least one decision-making layer and an output layer. The number of nodes used in each layer as well as the number of layers and the connective weights associated with each node in the decision-making layer of the specific neural network are dependent on the same factors identified when referring to the major neural network.

Referring to FIG. 2, the major neural network 42 is configured to receive frequency data from the controller 38 for a major media type determination. After identifying the incoming medium 26 as one of the five major media types, the medium is further subjected to analysis within the specific media-identifying neural network 43 for a specific media type determination. Subsequently, a print mode is selected by a printer driver 45 for the incoming medium.

In a second embodiment under the major category determination step 14 of FIG. 1, the 168 frequency components are categorized as one of the five major media types without being subjected to the major media-identifying neural network 42 of FIG. 3. Rather, other categorizing techniques that do not include a neural network are utilized for the media type selection in step 14. In an exemplary embodiment, the ratio of the spectral signals corresponding to the diffuse reflectance light beam 32 (FIG. 2) and the specular reflectance light beam 36 are analyzed to determine a major print medium type. Following a determination of the incoming print medium as being one of the five major media types, the print medium is subjected to analysis within the specific media-identifying neural network 43 (FIG. 2) in the specific category determination step 16 of FIG. 1.

As was previously stated, each decision-making node is associated with a connective weight. For a given decision-making node, the associated weight corresponding to an input determines the relative strength an input value has on the output value. Consequently, the weights determine the classification for a given set of input data. The weights assigned to each input are determined during the training phase.

Figure 5:
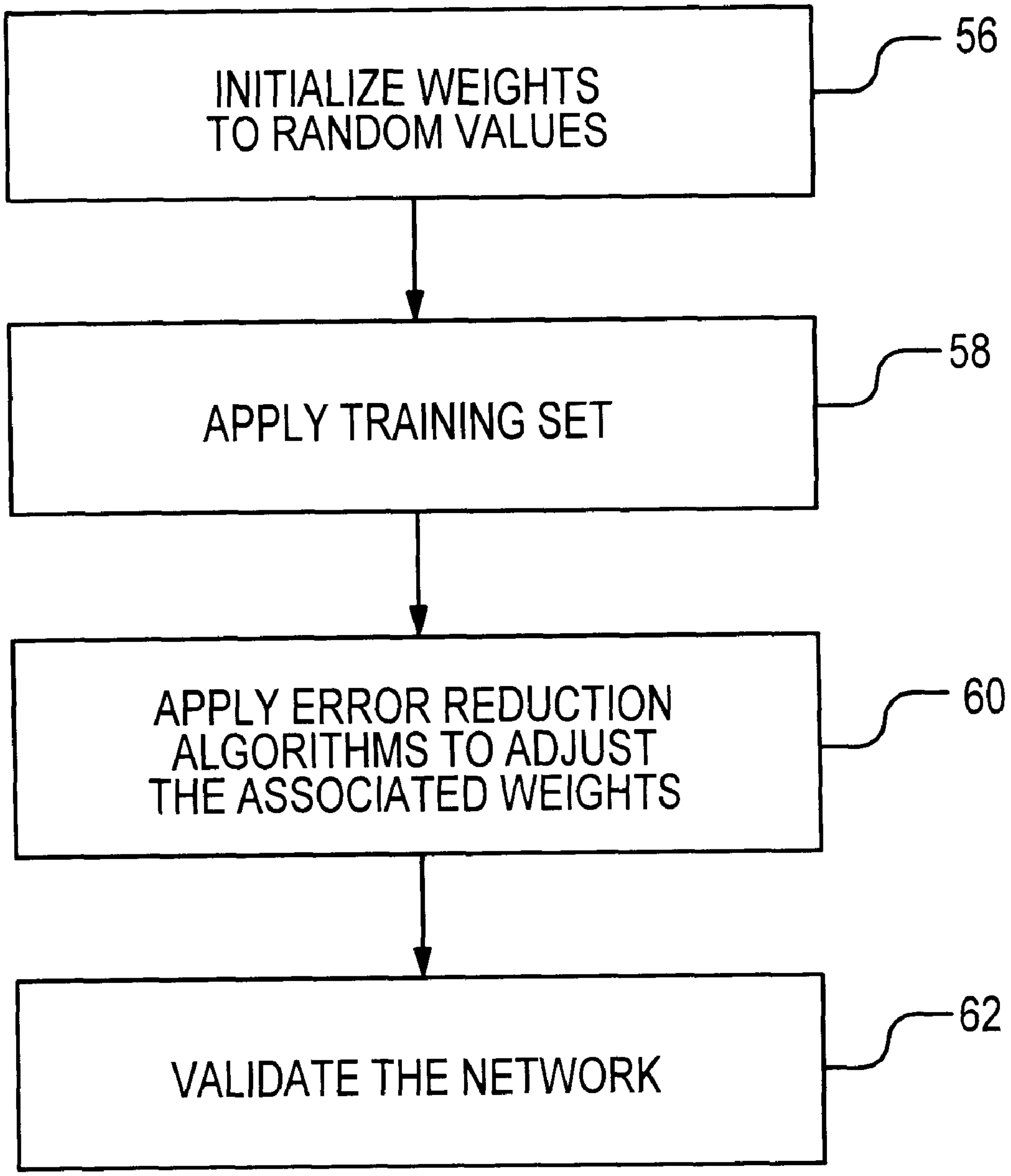
FIG. 5 is a process flow of steps for training the neural network of FIG. 3.

FIG. 5 shows a process flow of steps for training the neural network 42 of FIG. 3. In step 56, the weights are initialized to random values or to preselected values. In step 58, a set of training data for a particular class (e.g., transparency type) is provided to the input nodes of the network for training. In supervised training, many samples pertaining to a specific class are input to the network to "teach" the system and recognize characteristics indicative of the selected class. A media detection system similar to the detection system 20 of FIG. 2 captures the diffuse and specular reflectance data reflected off a training medium. A discrete Fourier Transform function is performed on the data to produce 84 frequency-related components for the diffuse reflectance signals and 84 frequency-related components for the specular reflectance signals. Analysis by the decision-making nodes for that particular set of training data input to the network in step 58 results in the network outputting a value corresponding to that particular class.

In step 60, error reduction algorithms adjust the actual outputs to the target outputs by reducing the error space for each of the connective weights in the network. The adjustment utilizes genetic algorithms or simulated annealing algorithms to determine a global minima for each connection. An associated weight corresponding to a global minima reduces the measure of error in the network's results. Finally, a conjugate descent is performed to determine the direction of the global minima. While the invention is described as utilizing a combination of genetic or simulating annealing algorithms in conjunction with performing a conjugate descent, other error reduction means, such as back propagation means without utilizing the identified algorithms, may be used to approximate the actual associated weights to the target values.

In step 62, test samples are applied to the network to validate the accuracy of the system. If the error space is greater than the predetermined threshold value, the training process continues until the error space is found to be less than the pre-determined value. This process is repeated with the training data until the number of mistaken classifications is lower than the pre-determined threshold value. A separate training set may be used for each of the major media types, requiring steps of FIG. 5 to be repeated.

Moreover, faulty training sets of print media having characteristics not indicative of a transparency type, premium-paper type, plain-paper type, or photo-quality type are provided to the network to train the system to classify a corresponding incoming print medium as a "default type." Finally, while FIG. 5 is described as training the major neural network 42 for categorization, the same sequence of steps can be used for training the specific neural network for differentiating an identified major media type into narrower categories.

What is claimed is:

1. A method for classifying incoming media entering a printing device comprising the steps of:

optically viewing a portion of an incoming medium to generate data indicative of characteristics of said incoming medium;

subjecting said data to at least one neural network for determining a medium type, said neural network being adaptive with respect to determinations of assignments of weights for application to said data, said assignments being based upon adaptive training of said neural network; and selecting an operational print mode for said printing device at least partially based on an output of said neural network.

2. The method of claim 1 further comprising a step of training said at least one neural network, said step of training including providing said neural network with a different training set of print media for each of a plurality of preselected medium types said training sets having attributes indicative of characteristics of said medium types.

3. The method of claim 2 wherein said step of training further includes utilizing error reduction algorithms for adjusting actual neural network outputs to target outputs by reducing an error space connecting nodes in said neural network.

4. The method of claim 3 wherein said step of utilizing said error reduction algorithms includes identifying global minima by employing one of a genetic algorithm and a simulated annealing algorithm.

5. The method of claim 3 further comprising a step of performing a conjugate descent to determine a direction of said global minima.

6. The method of claim 2 wherein said step of training includes providing said neural network with faulty training sets of media resulting in classifying said incoming medium as a default type of medium, said default type being one medium type in said plurality of preselected medium types.

7. The method of claim 1 wherein said step of optically viewing includes capturing diffuse reflectance data and specular reflectance data from said portion of said incoming medium.

8. The method of claim 7 further comprising a step of performing Fourier Transform to provide a plurality of frequency-related components for said diffuse reflectance data and a plurality of frequency-related components for said specular reflectance data.

9. The method of claim 1 wherein said step of optically viewing said incoming medium includes providing a hard-copy print medium for analysis.

10. A method of making an automated media selection for incoming print media comprising the steps of:

establishing an evaluation system for decision making having multiple layers, including using automated processing techniques to define a plurality of nodes arranged in an input layer, an adaptive layer, and an output layer, said nodes in said adaptive layer being connected with a plurality of weighted inputs, said weighted inputs being adaptively determined by using a plurality of training media during a training phase assigning said weighted inputs;

collecting data relevant to an incoming print medium;

processing said data through said evaluation system for selectively classifying said incoming print medium to a type of print medium; and selecting an operational print mode for said incoming print medium as a response to a determination during said processing of said data through said evaluation system.

11. The method of claim 10 wherein said step of selecting includes selectively classifying said print medium as one of a transparency type, premium-paper type, plain-paper type, photo-quality type and default type.

12. The method of claim 10 wherein said step of establishing includes providing a feedforward evaluation system for neural network processing.

13. The method of claim 10 further comprising a step of spectrally analyzing said data relevant to said incoming print medium to provide frequency-related values.

14. The method of claim 13 wherein said step of analyzing further includes processing said frequency-related values within a first neural network for identifying a print medium type for said incoming print medium.

15. The method of claim 14 wherein said step of identifying said print medium type further includes subjecting said data relevant to said incoming print medium to a second neural network for differentiating said print medium into a more specific category within said print medium type.

16. A classifying system for categorizing incoming print media comprising:

a media detection system for capturing data associated with an incoming print medium; and a media-identifying neural network having an input stage, an output stage and at least one decision-making stage, said decision-making stage comprising a plurality of classification nodes, each of said classification nodes configured to receive a plurality of weighted inputs from other classification nodes within said decision-making stage and from said input stage for generating an output, said output being representative of a type of print medium for said incoming print medium.

17. The classifying system of claim 16 wherein said media detection system comprises:

a light source configured to provide an illumination onto a region of interest of said incoming print medium;

a diffuse sensor configured to receive diffuse reflectance from said region of interest; and a specular sensor configured to receive specular reflectance from said region of interest.

18. The classifying system of claim 16 wherein said media-identifying neural network comprises a plurality of first nodes at said input stage, each of said first nodes being configured to receive a frequency component value corresponding to said data captured by said media detection system.

19. The classifying system of claim 16 wherein said media-identifying neural network comprises five nodes at said output stage, each said output stage being specific to a media type.

20. The classifying system of claim 16 further comprising a second neural network that is connected to receive said outputs from said output stage of said media-identifying neural network to subcategorize said incoming print medium as being one of a medium type which is more specific than said type of print medium represented by said outputs.

* * * * *

UNITED STATES PATENT AND TRADEMARK OFFICE

CERTIFICATE OF CORRECTION

PATENT NO. : 6,725,207 B2 
DATED : April 20, 2004
INVENTOR(S) : Richard S. Swimm It is certified that error appears in the above-identified patent and that said Letters Patent is hereby corrected as shown below:

Column 3,
Line 19, delete “categorizes” and insert therefor -- categories --

Column 7,
Line 63, after “upon” delete “adaptive”

Column 8,
Line 5, after “types” insert -- , --

Signed and Sealed this

Twenty-fifth Day of January, 2005

JON W. DUDAS
*Director of the United States Patent and Trademark Office*